July 11, 1939.   C. L. WATERHOUSE, JR   2,165,594
AUTOMOBILE BODY CONSTRUCTION
Filed Jan. 31, 1938   3 Sheets-Sheet 1
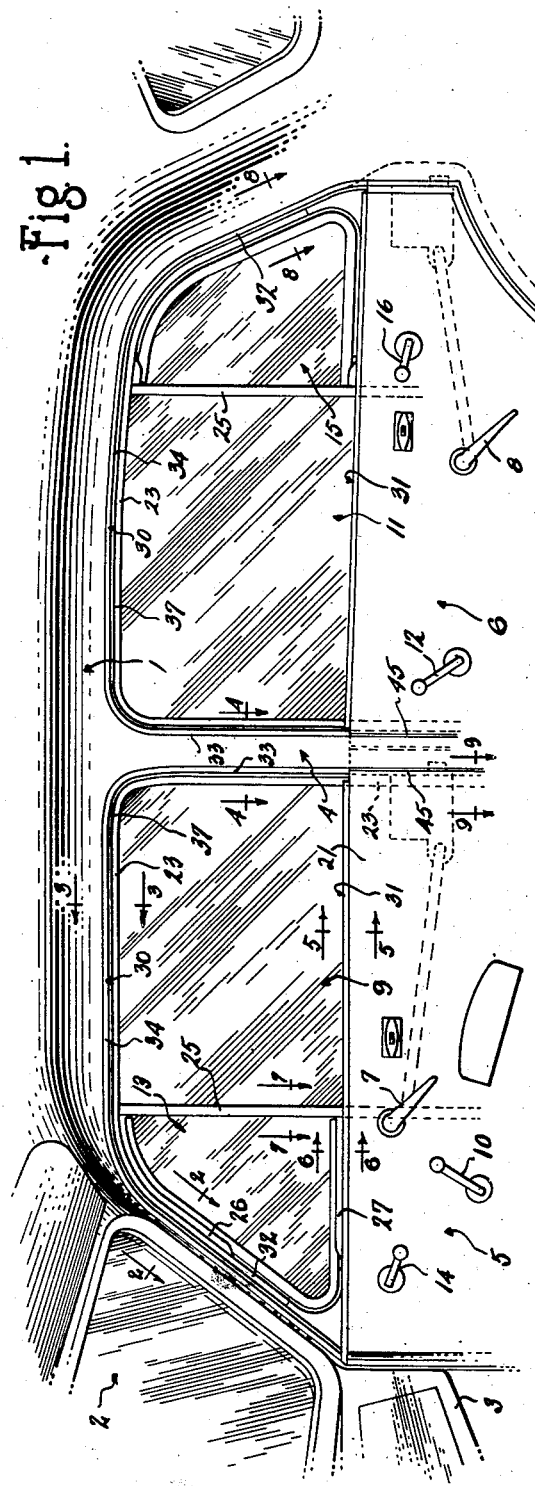
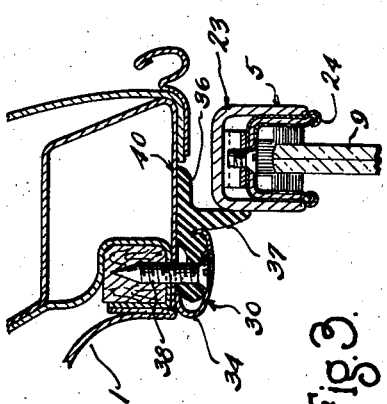
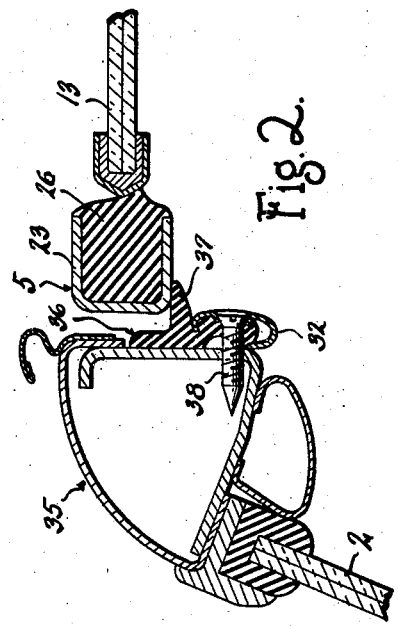
INVENTOR.
Charles L. Waterhouse Jr.
BY
Barnes, Kisselle, Laughlin & Raisch
ATTORNEYS July 11, 1939.　　　C. L. WATERHOUSE, JR　　　2,165,594
AUTOMOBILE BODY CONSTRUCTION
Filed Jan. 31, 1938　　　3 Sheets-Sheet 2
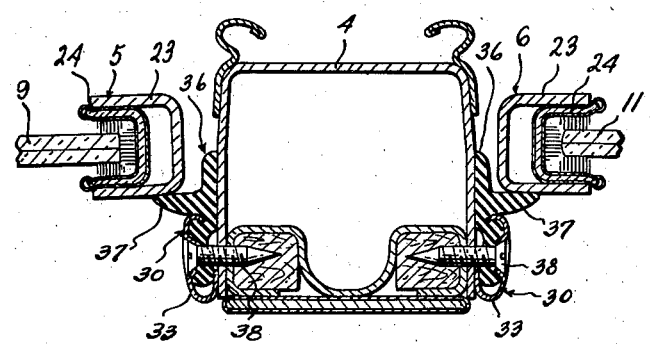
Fig. 4.
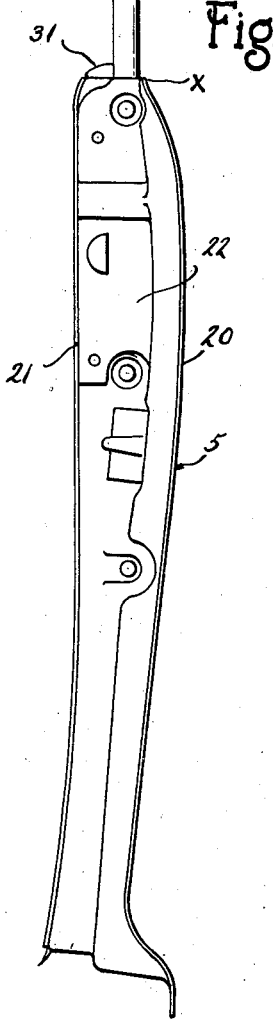
Fig. 10.
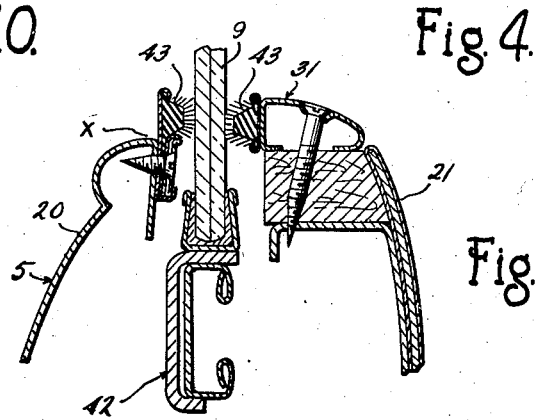
Fig. 5.
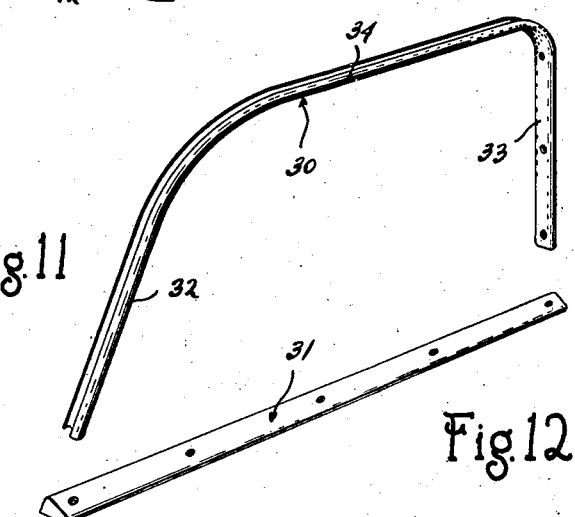
Fig. 11.
Fig. 12.
INVENTOR.
Charles L. Waterhouse Jr.
BY
ATTORNEYS July 11, 1939.　　C. L. WATERHOUSE, JR　　2,165,594
AUTOMOBILE BODY CONSTRUCTION
Filed Jan. 31, 1938　　3 Sheets-Sheet 3

INVENTOR.
Charles L. Waterhouse Jr.
BY
Barnes, Kisselle, Laughlin & Rauch
ATTORNEY. S Patented July 11, 1939

2,165,594

UNITED STATES PATENT OFFICE 2,165,594

AUTOMOBILE BODY CONSTRUCTION

Charles L. Waterhouse, Jr., Dearborn, Mich., assignor to General Motors Corporation, Detroit, Mich., a corporation of Delaware Application January 31, 1938, Serial No. 187,850

7 Claims. (Cl. 296—44)

This invention relates to automobile bodies, and it has to do particularly with an improved construction at the window opening which may be closed either in whole or in part by a sliding window panel.

In automobile bodies of the closed type, it has been the usual practice to provide the doors with posts extending upwardly from the belt line and a header connecting the posts to thus define a window opening. The posts and header are equipped with window runs or channels and carry more or less ornamental trim strips surrounding the window on the inside of the car known as garnish moldings. This invention aims to provide an improved construction where the door structure does not extend above the belt line. In other words, the real structure of the door terminates substantially at the lower boundary of what heretofore has been the window opening. The door carries window guides which extend above the belt line and these window guides are of relatively light construction with small cross dimensions and really constitute no structural part of the door. Therefore, no garnish molding is carried by the door adjacent the front, rear and top edges of the window opening. In order to provide a suitable finished appearance wherein the window opening is defined by a so-called garnish molding on all of its sides in the interior of the car, this invention divides the garnish molding into parts. One or more parts are carried by permanent portions of the closed body, as for example, the body door pillars and header, while another part of the garnish molding is carried by the door, as for example, substantially at the belt line or at the so-called window sill. When the door is closed the parts of this garnish molding substantially fit and align with each other so that the usual garnish molding trim surrounding the window opening completes the interior of the car. When the door is open the garnish molding separates with some portions remaining fixed with the car body and one or more other portions swinging with the door. Moreover, the post construction of the body may be made relatively small in cross section for increased visibility, and to facilitate such construction the garnish molding portions which are carried by the body not only perform a function of serving as a trim or finishing strip to satisfy the aesthetic sense, but perform a mechanical function in the holding of one or more weatherstrips in place. In this manner the number of parts are minimized and the body post construction may be reduced in cross section.

One construction for carrying out the present invention is illustrated in the accompanying drawings. This construction will be specifically described below, although it is to be understood that other constructions or equivalents of the described construction, such as fall within the scope of the appended claims, are covered by the invention.

Fig. 1 is a general view of the interior of an automobile body illustrating the invention.

Fig. 2 is an enlarged cross sectional view taken substantially on line 2—2 of Fig. 1 illustrating the forward edge of a window.

Fig. 3 is an enlarged cross sectional view taken substantially on line 3—3 of Fig. 1 illustrating the arrangement at the header.

Fig. 4 is an enlarged cross sectional view taken substantially on line 4—4 of Fig. 1 illustrating an intermediate post construction.

Fig. 5 is an enlarged cross sectional view taken substantially on line 5—5 of Fig. 1 showing the arrangement at the belt line.

Fig. 10 is an end view of a door in open position.

Fig. 11 is a perspective view of one garnish molding part.

Fig. 12 is a perspective view of another garnish molding part.

Figure 6:
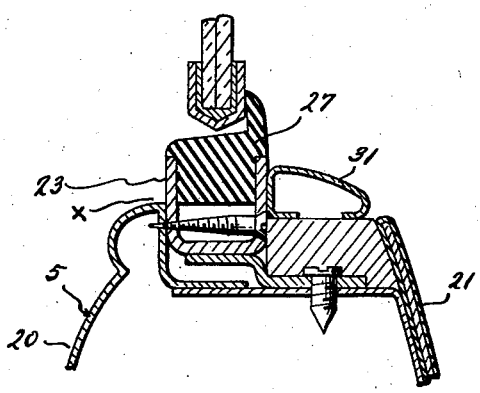
Fig. 6 is an enlarged cross sectional view taken substantially on line 6—6 of Fig. 1 illustrating an arrangement where a ventilating panel is used.

In Fig. 1 the interior of a car is illustrated. A permanent top is shown at 1, a windshield at the front at 2, an instrument panel at 3 and a post construction at 4. Forward of the post 4 is a door 5 which is hinged at its forward edge, while to the rear of the post 4 is a door 6 hinged at its forward edge. These doors may be controlled by handles 7 and 8 respectively. The front door has a sliding window panel 9 controllable for vertical adjustment through the means of a handle 10, while the rear door has a slidable window panel 11 which may be vertically regulated by a handle 12. While the invention may be employed with or without the use of swinging window panels, such panels are shown herein, one being illustrated at 13 in the forward door controllable by a handle 14, and the other being illustrated at 15 at the rear of the door 6 and controllable by a handle 16.

A door construction is illustrated in Fig. 10 and the structure proper has an outer panel 20 and an inner panel or face 21 and they both terminate substantially at the belt line illustrated at the point X. As will be seen, the door has some thickness and its exposed edge 22 contains a latch bolt, a dovetail or bumper, or the like.

Figure 7:
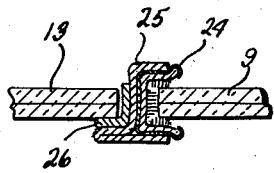
Fig. 7 is a cross sectional view taken substantially on line 7—7 of Fig. 1.
Figure 9:
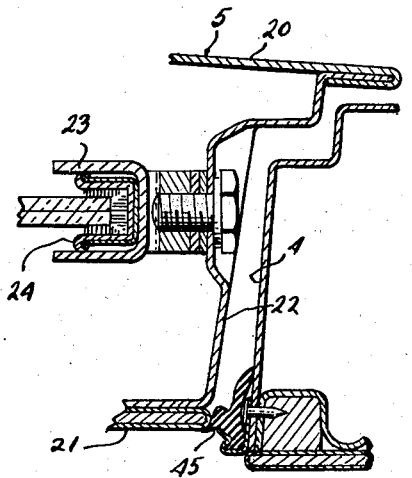
Fig. 9 is an enlarged cross sectional view taken substantially on line 9—9 of Fig. 1 illustrating a construction below the belt line.

The door carries a window guide generally illustrated at 23 which extends down into the well between the panels 20 and 21 for guiding the vertically adjustable window, but the door does not have the usual posts or header. As shown in Fig. 4 the window guide or frame for each vertically sliding window is of channel construction equipped with window guide members 24 for directly engaging the edges of the panel. At the top the channel or guide 23 extends generally horizontally as illustrated in Fig. 3. Where the window opening is closed by two panels, one vertically adjustable and one swinging ventilating panel, the channel 23 may also encompass the swinging panel as illustrated in Fig. 2 and may underlie the under edge of the swinging panel as shown in Fig. 6. Between the two panels a strip 25 may be located which may have a cross sectional shape in the form of a small h (Fig. 7). The strip 25 may be arranged to guide the forward vertical edge of the panel 9 where a swinging ventilating panel is used as shown in Fig. 7. Where swinging window panels are used the strips 25 or pieces extending therefrom extend down into the window well a distance sufficient to take care of the lowermost position of the vertically sliding window. However, where the swinging panels are not used, the channel 23 may have both sides extending downwardly for this purpose after the manner of the one side as illustrated in Fig. 9. The rear edge of the swinging panel 13 may seat against a sealing strip 26 also carried by the strip 25, while the portions of the channel 23 encompassing the forward and lower edges of the swinging panel may be equipped with sealing members 26 and 27, as shown in Figs. 2 and 6.

The above description has been specifically applied to the window of the forward door. The same general arrangement may be carried out at the rear door, and like reference characters are applied to like parts.

The garnish molding is preferably made in two separable parts, as illustrated in Figs. 11 and 12. One part of the garnish molding is generally illustrated at 30, and this part of the garnish molding is to be attached to a fixed or permanent part of the vehicle body. The other part of the garnish molding is illustrated at 31 and is to be attached to the door at the belt line. The part 30 will be shaped to fit the body posts and header and for this purpose is bent to have a portion 32 for fitting against one body post and a part 33 for fitting against another body post and an intermediate portion 34 for fitting against the header. The installation of the garnish molding is shown in more detail as applied to the forward door. As illustrated in Fig. 2, the garnish molding is attached to the forward post of the body generally illustrated at 35. The molding is so formed as to hold and secure a weatherstrip 36 in place, the weatherstrip being suitably shaped with a base to fit against the post and with a projecting rib 37 arranged to seal against the channel 23. The parts may be secured in any suitable manner, as for example, by drive screws 38 where the body construction is metal. The intermediate portion 34 of the garnish molding section 30 is shown in Fig. 3 attached to the header 40 of the body, and the portion 33 is shown attached to the post 4 of the body in Fig. 4. The weatherstrip 36 is co-extensive with the garnish molding so that when the door is closed the channel 23 seals thereagainst as illustrated in the views 2, 3 and 4. Below the belt line the door may seal against weatherstrips or wind hose, or both, and such a weatherstrip is illustrated at 45 in Fig. 9.

The section 31 of the garnish molding is attached to the door and forms a sill, so to speak, defining the lower edge of the window opening, as illustrated in Fig. 5. The window panel 9 is equipped with a construction generally illustrated at 42 for the reception of control means for vertically adjusting the same, and window seal members 43 may engage the glass where the same enters the well in the door. The panel 13 may swing on a vertical pivot with its rear edge opening outwardly as illustrated in Fig. 7.

Figure 8:
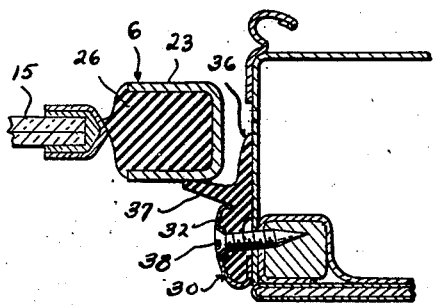
Fig. 8 is an enlarged cross sectional view taken substantially on line 8—8 of Fig. 1 illustrating an arrangement where a rear ventilating panel is used.

The arrangement of the garnish molding may be the same for the rear window as it is for the front window, the construction at the intermediate post being illustrated in Fig. 4. The rear panel 15 may be similarly adjustable with its rear edge sealing against the strip 26 as shown in Fig. 8.

As illustrated in Fig. 9, the channel 23 extends down into the well of the door and holds the window run 24, and this channel extends down into the well as far as is necessary to accommodate the window in its lowermost position of adjustment. The same thing is true with respect to the rear door 6. It will be seen, therefore, that when either one of the doors is closed the window is defined on the interior of the car by a garnish molding comprising section 30 with its parts 32, 34 and 33 attached to a permanent part of the body, section 31 attached to the door. Therefore, the interior appearance is much the same as the appearance inside a closed body of the standard type where the door is equipped with posts and a header carrying a garnish molding extending around the window opening. However, when the door is opened section 31 moves with the door and the door appears substantially as illustrated in Fig. 10 with only the frame 23 and the window panel or panels carried thereby and including the strips 25 where a swinging ventilating panel is used. If the swinging ventilating panel is not used, the sliding panel may take up the entire space within the guide 23, in which event the dividing strip 25 will not be used. Therefore, it will be seen that the same garnish molding arrangement may be used with or without window arrangements embodying swinging ventilating panels. When the door is closed the garnish molding section 31 has sufficient clearance with respect to the ends of the garnish molding section 30 to move into substantial alignment therewith to form a substantially unbroken molding around the window opening.

I claim:

1. In a closed automobile body having an opening to be closed by a door and defined in part by body posts and a header, a swinging door structure terminating at about the belt line of the body for closing the lower portion of the opening, a frame carried by and projecting above the door structure and having a shape corresponding substantially to the shape of the opening defined by the posts and header above the door structure, a window panel adjustable for opening and closing the opening defined by the frame, and a garnish molding including portions fixedly secured to the posts and header of the body and within the opening and a portion fixedly secured to the door structure along the top of the door structure, said portions arranged to come into substantial alignment when the door is closed.

2. In a closed automobile body having an opening to be closed by a door and defined in part by body posts and a header, a swinging door structure having a window well terminating at about the belt line of the body for closing the lower portion of the opening, a window panel adjustable in an up and down direction into and out of the well, a frame carried by the door and projecting above the belt line for guiding and supporting the edges of the window panel, said frame having a shape corresponding substantially to the shape of the body posts and header above the door, and a garnish molding for substantially defining the window opening when the door is closed, including portions fixedly secured to the posts and header of the body within the opening and a portion fixedly secured to the door structure along the top edge thereof and adjacent the opening to the well, said portions arranged to come into substantial alignment when the door is closed.

3. In a closed automobile body having an opening to be closed by a door and defined in part by body posts and a header, a swinging door structure terminating at about the belt line of the body for closing the lower portion of the opening, a fixed frame carried by and projecting above the door structure and having a shape corresponding substantially to the shape of but smaller than the portion of the opening above the door, said door having a well therein, a window panel slidably adjustable in an up and down direction for closing part of the opening within the frame, said frame serving to guide and hold some of the edges of the window panel, a swinging window panel mounted in another portion of the opening defined by the frame, a weather strip on the inner peripheral faces of said posts and header and a garnish molding including portions fixedly secured to the inner peripheral faces of said posts and header of the body and a portion fixedly secured along the top of the door, said portions arranged to come into substantial alignment when the door is closed.

4. In a closed automobile body having an opening to be closed by a door, a swinging door structure terminating at about the belt line of the body and closing the lower portion of the opening, one or more window panels carried by the door for closing the upper portion of the opening, a frame structure carried by the door for engaging some window panel edges and having a shape substantially corresponding to the shape of the said opening above the door, and a garnish molding having portions fixedly secured to the automobile body portions which define the upper part of said opening and which are disposed within said opening and a portion fixedly secured substantially to the top of the door structure and movable therewith, said garnish molding portions arranged to come into substantial alignment when the door is closed to substantially define the window opening above the door structure.

5. In a closed automobile body having an opening to be closed by a door, a swinging door structure terminating at about the belt line of the body for closing the lower portion of the opening, one or more adjustable window panels carried by the door for closing the upper portion of the opening, a frame structure for defining the peripheral edges of the window panels, having a shape substantially corresponding to the upper portion of the opening, and a garnish molding including portions fixedly secured to the parts of the automobile body defining the upper portion of the opening and disposed within said opening and including a portion mounted upon substantially the upper portion of the door and movable therewith, said portions arranged to come into substantial alignment when the door is closed to form a substantially continuous garnish molding around the window opening.

6. In a closed automobile body having an opening to be closed by a door, a swinging door structure terminating at about the belt line of the body for closing the lower portion of the opening, one or more adjustable window panels carried by the door for closing the upper portion of the opening, a frame structure for defining the peripheral edges of the window panels, having a shape substantially corresponding to but smaller than the upper portion of the opening, a weatherstrip projecting into the upper portion of said opening for engaging the said frame when the door is closed and a garnish molding including portions fixedly secured to the peripheral faces of the parts of the automobile body defining the upper portion of said opening, said portions of the garnish molding overlying portions of the weatherstrip and serving to hold the weatherstrip in place, said garnish molding including a portion secured substantially to the top of the door structure and movable therewith, the portions of the garnish molding arranged to come into substantial alignment when the door is closed.

7. In a closed automobile body having an opening to be closed by a door and defined in part by posts and a header of the automobile body, a swinging door structure terminating at about the belt line of the body for closing the lower portion of the opening, one or more adjustable window panels carried by the door structure for closing the upper portion of the opening, a frame carried by the door structure serving to define the peripheral edges of the window panels and to support the window panels and having a shape substantially corresponding to but smaller than the upper portion of the opening as defined by the posts and header, a weatherstrip on the inner peripheral faces of the posts and header arranged to contact with the frame when the door is closed, a garnish molding section secured to said faces of the posts and header and serving to secure the weatherstrip in place on the said posts and header, and another garnish molding section secured substantially to the top of the door structure, said sections arranged to come into substantial alignment when the door is closed.

CHARLES L. WATERHOUSE, Jr.